(12) United States Patent
Zavalkovsky et al.

(10) Patent No.: US 6,959,332 B1
(45) Date of Patent: Oct. 25, 2005

(54) BASIC COMMAND REPRESENTATION OF QUALITY OF SERVICE POLICIES

(75) Inventors: Arthur Zavalkovsky, Herzliya Pituach (IL); Nira Leibman, Herzliya Pituach (IL)

(73) Assignee: Cisco Technology, Inc., San Jose, CA (US)

( * ) Notice: Subject to any disclaimer, the term of this patent is extended or adjusted under 35 U.S.C. 154(b) by 711 days.

(21) Appl. No.: 09/614,365

(22) Filed: Jul. 12, 2000

(51) Int. Cl.[7] .................................. G06F 15/173
(52) U.S. Cl. .................. 709/223; 709/228; 709/224; 709/226
(58) Field of Search ............... 709/220, 221, 709/223, 226, 228, 229, 224

(56) References Cited

U.S. PATENT DOCUMENTS

| | | | |
|---|---|---|---|
| 5,359,593 A | | 10/1994 | Derby et al. |
| 5,594,792 A | * | 1/1997 | Chouraki et al. ............ 379/269 |
| 5,928,331 A | | 7/1999 | Bushmitch |
| 5,968,176 A | * | 10/1999 | Nessett et al. .............. 713/201 |
| 5,970,064 A | | 10/1999 | Clark et al. ................. 370/351 |

(Continued)

FOREIGN PATENT DOCUMENTS

EP 0726004 * 6/1995

OTHER PUBLICATIONS

S. Blake, et al., "An Architecture for Differentiated Services," Dec. 1998, pp. 1–36.
D. Durham, et al., "The COPS (Common Open Policy Service) Protocol," Jan. 2000, pp. 1–38.
S. Herzog, et al., "COPS usage for RSVP," Jan. 2000, pp. 1–17.
R. Braden, et al., "Resource ReSerVation Protocol (RSVP)—Version 1 Functional Specification," Sep. 1997, http://www.ietf.org/rfc/rfc2205.txt.?number=2205, printed Sep. 19, 2003, pp. 1–105.

*Primary Examiner*—Nabil El-Hady
(74) *Attorney, Agent, or Firm*—Hickman Palermo Truong & Becker LLP

(57) ABSTRACT

A method of converting an abstract quality of service policy into a new configuration for one or more network devices of managed network, as routers. The abstract quality of service policy is received and converted into a first set of one or more basic commands. A current configuration of one of the network devices is obtained, e.g. through device discovery. The configuration is received in the form of one or more first command line interface (CLI) commands that represent the current configuration of the network device. A second set of one or more basic commands that correspond to the current configuration of the network device is determined, based on the first CLI commands. The first and second sets of basic commands are transformed into one or more second CLI commands which, when executed by the network device, will create a new configuration for the network device that implements the abstract quality of service policy. Merging and aggregation, based on state values associated with the basic commands, is carried out to remove any duplicate commands.

36 Claims, 10 Drawing Sheets

U.S. PATENT DOCUMENTS

| | | | |
|---|---|---|---|
| 6,009,081 A * | 12/1999 | Wheeler et al. | 370/255 |
| 6,021,263 A | 2/2000 | Kujoory et al. | |
| 6,021,439 A | 2/2000 | Turek et al. | 709/224 |
| 6,028,842 A | 2/2000 | Chapman et al. | 370/235 |
| 6,046,980 A | 4/2000 | Packer | |
| 6,047,322 A | 4/2000 | Vaid et al. | |
| 6,061,725 A | 5/2000 | Schwaller et al. | |
| 6,104,700 A | 8/2000 | Haddock et al. | 370/235 |
| 6,118,760 A | 9/2000 | Zaumen et al. | 370/229 |
| 6,154,776 A | 11/2000 | Martin | 709/226 |
| 6,167,445 A | 12/2000 | Gai et al. | |
| 6,169,748 B1 | 1/2001 | Barbas et al. | 370/468 |
| 6,212,184 B1 | 4/2001 | Venkatachary et al. | |
| 6,286,052 B1 | 9/2001 | McCloghrie et al. | |
| 6,301,253 B1 | 10/2001 | Ichikawa | 370/395 |
| 6,301,613 B1 | 10/2001 | Ahlstrom et al. | 709/223 |
| 6,324,184 B1 | 11/2001 | Hou et al. | |
| 6,327,618 B1 | 12/2001 | Ahlstrom et al. | 709/223 |
| 6,363,429 B1 | 3/2002 | Ketcham | 709/235 |
| 6,393,473 B1 * | 5/2002 | Chu | 709/223 |
| 6,401,240 B1 | 6/2002 | Summers | |
| 6,424,659 B2 | 7/2002 | Viswanadham et al. | |
| 6,430,154 B1 | 8/2002 | Hunt et al. | |
| 6,442,151 B1 | 8/2002 | H'mimy et al. | |
| 6,463,470 B1 | 10/2002 | Mohaban et al. | |
| 6,466,984 B1 * | 10/2002 | Naveh et al. | 709/228 |
| 6,473,793 B1 | 10/2002 | Dillon et al. | |
| 6,483,805 B1 | 11/2002 | Davies et al. | |
| 6,484,261 B1 * | 11/2002 | Wiegel | 713/201 |
| 6,539,425 B1 | 3/2003 | Stevens et al. | |
| 6,570,875 B1 | 5/2003 | Hegde | |
| 6,577,644 B1 | 6/2003 | Chuah et al. | |
| 6,594,268 B1 | 7/2003 | Aukia et al. | |
| 6,601,082 B1 | 7/2003 | Durham et al. | |
| 6,611,864 B2 | 8/2003 | Putzolu et al. | |
| 6,621,793 B2 | 9/2003 | Widegreen et al. | |
| 6,622,170 B1 | 9/2003 | Harrison et al. | |
| 6,651,191 B1 | 11/2003 | Vacante et al. | |
| 6,671,724 B1 | 12/2003 | Pandya et al. | |
| 6,684,244 B1 * | 1/2004 | Goldman et al. | 709/223 |

* cited by examiner

BASIC COMMAND REPRESENTATION OF QUALITY OF SERVICE POLICIES

FIELD OF THE INVENTION

The present invention generally relates to data processing in a network communication system. The invention relates more specifically to methods and apparatus that provide a basic command representation of abstract policies that define quality of service treatments for network data flows.

BACKGROUND OF THE INVENTION

A computer network generally comprises a plurality of interconnected electronic elements that transmit or receive data frames. A common type of computer network is a local area network ("LAN") that generally comprises a privately owned network within a single building or campus. LANs employ a data communication protocol such as Ethernet, FDDI or Token Ring, which defines the functions performed by the data link and physical layers of the LAN. The Open Systems Interconnection (OSI) Reference Model is used to identify the nature of communications that occur at different logical levels of a network. In many instances, multiple LANs may be interconnected by point-to-point links, microwave transceivers, satellite hookups, etc., to form a wide area network ("WAN"), campus network or Intranet. These internetworks may be coupled through one or more gateways to the global, packet-switched internetwork knows as Internet.

Each network element operates using network communication software, e.g., in accordance with Transport Control Protocol/Internet Protocol (TCP/IP). TCP/IP generally consists of rules defining how network elements interact, and defines communication layers that include a transport layer and a network layer. At the transport layer, TCP/IP includes both the User Data Protocol (UDP), which is a connectionless transport protocol, and TCP, which is a reliable, connection-oriented transport protocol.

One or more intermediate network devices are often used to couple LANs together and allow the corresponding entities to exchange information. A bridge may be used to provide a "bridging" function between two or more LANs, or a switch may be utilized to provide a "switching" function for transferring information, such as data frames or packets, among entities of a computer network. Switches may operate at various levels of the communication stack. For example, a switch may operate at Layer 2 (the data link layer, in the OSI Reference Model), which includes the Logical Link Control (LLC) and Media Access Control (MAC) sub-layers.

Other intermediate devices, e.g., routers, may operate at higher layers, such as Layer 3, which in TCP/IP networks corresponds to the Internet Protocol (IP) layer. IP data packets each include a header that contains an IP source address and an IP destination address. Routers or Layer 3 switches may re-assemble or convert received data frames from one LAN standard (e.g., Ethernet) to another (e.g., Token Ring). Thus, Layer 3 devices are often used to interconnect dissimilar subnetworks. Some Layer 3 intermediate network devices may also examine the transport layer headers of received messages to identify the corresponding TCP or UDP port numbers being utilized by the corresponding network entities. Many applications are assigned specific, fixed TCP and/or UDP port numbers in accordance with Request For Comments (RFC) 1700. For example, TCP/UDP port 80 corresponds to the Hypertext Transport Protocol (HTTP), while port 21 corresponds to File Transfer Protocol (FTP) service.

Computer networks include numerous services and resources for use in moving traffic throughout the network. For example, different network links, such as Fast Ethernet, Asynchronous Transfer Mode (ATM) channels, network tunnels, satellite links, etc., offer unique speed and bandwidth capabilities. Particular intermediate devices also include specific resources or services, such as number of priority queues, filter settings, availability of different queue selection strategies, congestion control algorithms, etc.

Individual frames or packets can be marked so that intermediate devices may treat them in a predetermined manner. For example, the Institute of Electrical and Electronics Engineers (IEEE) describes additional information for the MAC header of Data Link Layer frames in Appendix 802.1p to the 802.1D bridge standard.

A Data Link frame includes a MAC destination address (DA) field, a MAC source address (SA) field and a data field. According to the 802.1Q standard, a user_priority field, among others, is inserted after the MAC SA field. The user_priority field 108 may be loaded with a predetermined value (e.g., 0–7) that is associated with a particular quality of service treatment for the packet, such as background, best effort, excellent effort, etc. Network devices, upon examining the user_priority field of received Data Link frames, apply the corresponding treatment to the frames. For example, an intermediate device may have a plurality of transmission priority queues per port, and may assign frames to different queues of a destination port on the basis of the frame's user priority value.

A Network Layer packet based on Internet Protocol includes a type_of_service (ToS) field, a protocol field, an IP source address (SA) field, an IP destination address (DA) field and a data field. The ToS field is used to specify a particular service to be applied to the packet, such as high reliability, fast delivery, accurate delivery, etc., and comprises a number of sub-fields. The sub-fields may include a 3-bit IP precedence (IPP) field and three one-bit flags that signify Delay, Throughput, and Reliability. By setting the flags, a device may indicate whether delay, throughput, or reliability is most important for the traffic associated with the packet. Version 6 of Internet Protocol (IPv6) defines a traffic class field, which is also intended to be used for defining the type of service to be applied to the associated packet.

A working group of the Internet Engineering Task Force (IETF) has proposed replacing the ToS field of Network Layer packets with a one-octet differentiated services (DS) field that can be loaded with a differentiated services codepoint value. Layer 3 devices that are DS compliant apply a particular per-hop forwarding behavior to data packets based on the contents of the DS field. Examples of per-hop forwarding behaviors include expedited forwarding and assured forwarding. The DS field is typically loaded by DS compliant intermediate devices located at the border of a DS domain, which is a set of DS compliant intermediate devices under common network administration. Thereafter, interior DS compliant devices along the path apply the corresponding forwarding behavior to the packet.

A Transport Layer packet includes a source port field, a destination port field, and a data field, among others. Such fields preferably are loaded with the TCP or UDP port numbers that are utilized by corresponding network entities.

To interconnect dispersed computer networks, many organizations rely on the infrastructure and facilities of Internet Service Providers (ISPs). Each organization enters into a service-level agreement with its ISP. The service level agreements include one or more traffic specifications. The traffic specifications may place limits on the amount of resources that the organization may consume for a given price. For example, an organization may agree not to send traffic that exceeds a certain bandwidth, e.g., 1 Mb/s. Traffic entering the service provider's network is monitored to ensure that it complies with the relevant traffic specifications and is thus "in profile." Traffic that exceeds a traffic specification, and is therefore "out of profile," may be dropped or shaped or may cause an accounting change. Alternatively, the service provider may mark the traffic as exceeding the traffic specification, but allow it to proceed through the network anyway. If there is congestion, an intermediate network device may drop such marked traffic first in an effort to relieve the congestion.

A process executing at a network entity may generate hundreds or thousands of traffic flows that are transmitted across a network. Generally, a traffic flow is a set of messages (frames and/or packets) that typically correspond to a particular task, transaction or operation (e.g., a print transaction) and may be identified by various network and transport parameters, such as source and destination IP addresses, source and destination TCP/UDP port numbers, and transport protocol.

The treatment that is applied to different traffic flows may vary depending on the particular traffic flow at issue. For example, an online trading application may generate stock quote messages, stock transaction messages, transaction status messages, corporate financial information messages, print messages, data backup messages, etc. A network administrator may wish to apply a different policy or service treatment ("quality of service" or "QoS") to each traffic flow. For example, the network administrator may want a stock quote message to be given higher priority than a print transaction, or may wish to assign a higher priority to packets relating to a $1 million stock transaction message for a premium client as compared to than a $100 stock transaction message for a standard customer.

In current approaches, QoS policies may be defined in abstract form, but deployment of the policies requires conversion of the policies from the abstract format into one or more commands formatted according to the Command Line Interface (CLI) or similar command language. Some such command languages have arcane syntactical requirements and numerous parameter values. Thus, creating correct CLI commands may require extensive knowledge of routers and the CLI language, commands and parameters.

Based on the foregoing, there is a clear need in this field for a way to create quality of service policies in an intermediate representation that is more abstract than CLI commands, but more specific than a policy itself.

Another problem in this field involves deploying new policies to devices that already contain other configuration information. Each QoS policy is deployed to or deleted from a device on top of a current device configuration. It is critical to deploy the QoS policy without disrupting the pre-existing configuration, and without introducing operational changes that counteract existing operational modes.

Accordingly, there is a specific need for a way to represent QoS policies in an abstract manner, while taking into account the current configuration of a device.

SUMMARY OF THE INVENTION

The foregoing needs, and other needs and objects that will become apparent from the following description, are fulfilled by the present invention, which comprises, in one embodiment, a method of converting an abstract quality of service policy into a new configuration for one or more network devices of a managed network, such as routers. The policy expresses a quality of service treatment of traffic flows that are carried by the network, at a high level of abstraction, and is created and stored using a quality of service policy management system.

According to an embodiment of the method, the abstract quality of service policy is received and converted into a first set of one or more basic commands. A current configuration of one of the network devices is obtained, e.g., through device discovery. The configuration is received in the form of one or more first command line interface (CLI) commands that represent the current configuration of the network device. A second set of one or more basic commands that correspond to the current configuration of the network device is determined, based on the first CLI commands. The first and second sets of basic commands are transformed into one or more second CLI commands which, when executed by the network device, will create a new configuration for the network device that implements the abstract quality of service policy. Merging and aggregation, based on state values associated with the basic commands, is carried out to remove any duplicate commands.

As a result, CLI commands providing a new configuration that implements the policy are deployed to the device. The basic commands are expressed at a level of abstraction lower than the abstract policy and higher than the CLI commands.

In one embodiment, a software model defines basic command objects that can represent CLI commands, and can be used as the building blocks of an abstract command structure. The objects contain policy data itself, and can also express relations between a group of such objects. An abstract policy can be represented with all appropriate elements, e.g., filter, action parameters, device interface identifiers, and related data of resources on the device for each command. In a deployment process, basic command objects are created based on parsing an existing device configuration; such objects serve as a starting point for creating a new QoS configuration. The abstract policies, which are previously defined and stored in a database, are also translated into other basic command objects. The two sets of basic command objects are merged, resulting in a new QoS configuration for the device, expressed in CLI commands.

Other features and aspects will become apparent from the following description and claims.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus providing basic command representation of quality of service policies for treatment of network data flows is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Transforming Abstract Quality of Service Policies Into Device Configuration Information This disclosure generally relates to transforming abstract quality of service policies into device configuration information. In general, users of network device quality of service policy management systems desire to define quality of service policies in a high-level, abstract manner, and deploy the policies to network devices without any intermediate manual action.

Figure 1:
FIG. 1 is a simplified block diagram of communicating a quality of service policy to a network device.

FIG. 1 is a simplified block diagram that illustrates a user view of communicating a quality of service policy to a network device. A quality of service policy 2 is deployed to a network device 4. The quality of service policy 2 may be defined by a user of a quality of service policy management system. The network device 4 may be a switch, router, or other device in a network.

Quality of service policies specify, in an abstract manner, what quality of service treatment should be applied to a particular type of network traffic. An example of a policy definition is:

"ERPTraffic," "Protocol is TCP and Source is ERPServer," "Coloring, Precedence=Critical(5)" which means, "for traffic associated with an Enterprise Resource Planning (ERP) application, when the protocol is TCP and the traffic originates from the ERPServer, apply packet coloring with a precedence value of Critical." Policies may call for packet coloring, traffic shaping, limiting actions on routers or switches, priority queuing, custom queuing, etc. To deploy a quality of service policy to one or more devices in a network, the policy management system converts each policy into one or more Command Line Interface (CLI) commands that the operating system of the device can process. In some cases, new access control lists are created in the device. The CLI commands and access control lists that implement a policy are referred to as a new device configuration. When a device executes the CLI commands of a new configuration, the device becomes reconfigured and will implement the quality of service policy as the device handles network traffic.

Structural Overview

Figure 2A:
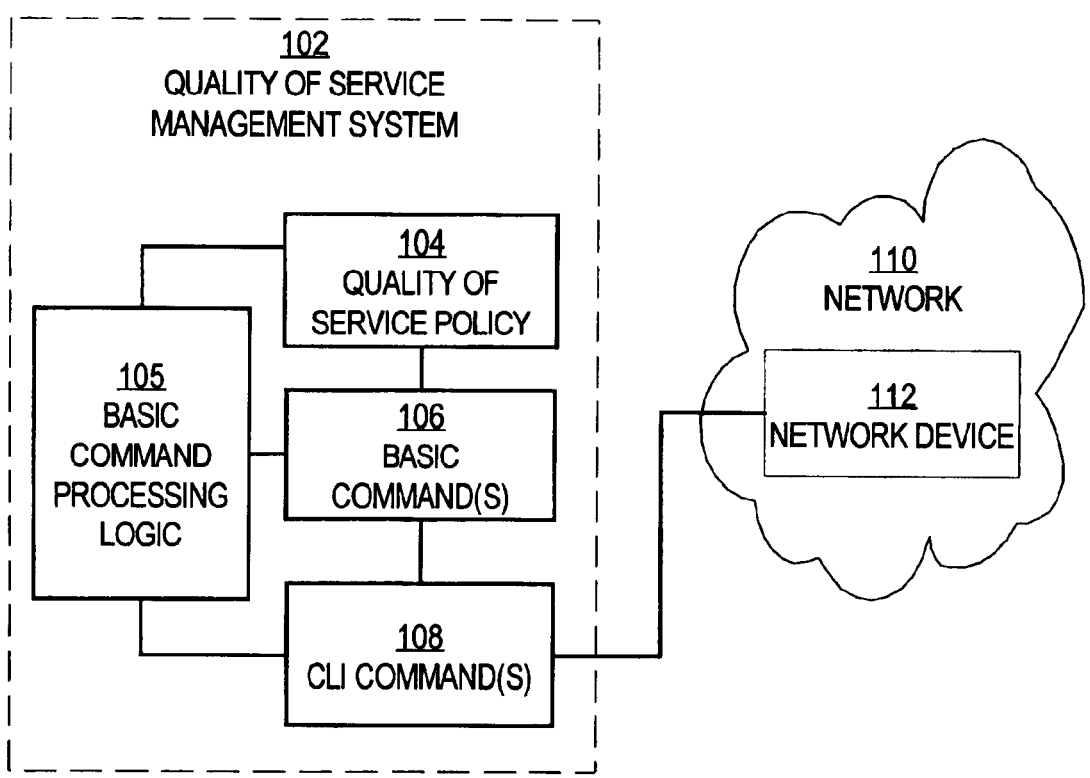
FIG. 2A is a block diagram of a quality of service management system that includes basic command processing logic.

FIG. 2A is a block diagram of a quality of service management system that includes basic command processing logic.

A quality of service management system 102 includes, among other elements, one or more stored quality of service policies 104, basic commands 106, and CLI commands 108. Basic command processing logic 105 can create, manipulate and manage the policies 104, basic commands 106, and CLI commands 108. One or more CLI commands 108, based on the policies 104, are deployed to one or more network devices 112 of a managed network 110.

Basic command processing logic 105 may be implemented in the form of one or more subroutines, methods, or other software elements that form part of a larger quality of service policy management system. An example of a quality of service policy management system in which such policies may be defined is Cisco QoS Policy Manager 1.1, commercially available from Cisco Systems, Inc. Network device 112 of FIG. 2A is one or more switches, routers, gateways, etc. Network 110 is one or more local area networks, wide area networks, campus networks, internetworks, etc.

In one embodiment, software elements create and manage software objects that model abstractions involved in policy definition and deployment. The software model provides an easier and extendable mechanism for configuring of abstract high-level policies on a network device. Also, this model supports presentation of low-level device configuration as a set of abstract policies. In the preferred software model, the following elements are defined: Abstract policy, CLI command, Basic Command. Each element is implemented as one or more programmatic objects, including methods, static variables, etc., in an object-oriented programming language such as Java® or C++.

Figure 2B:
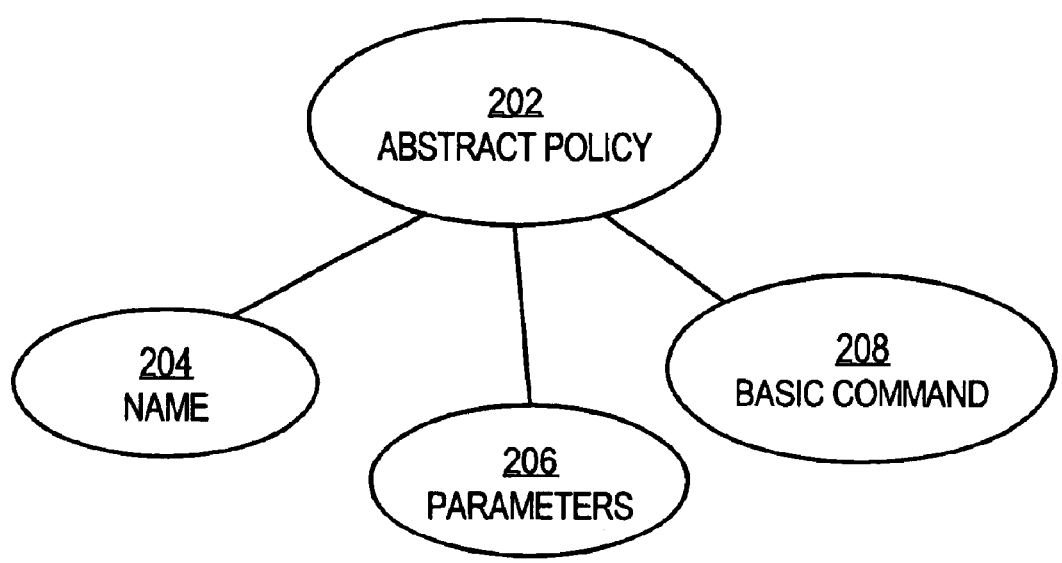
FIG. 2B is a block diagram of an abstract policy and its elements.

FIG. 2B is a block diagram of an abstract policy and its constituent elements, as created and managed by a preferred embodiment. For purposes of illustrating an example, FIG. 2B is described with respect to the system of FIG. 2A.

One or more Abstract Policy objects 202 are used for representing high-level policies that can be manipulated by the user. Thus, Abstract Policy objects 202 represent or model the information contained in each quality of service policy 104. The user can define an abstract policy on a device or device interface. Preferably, an Abstract Policy object 202 has the following methods: a Name method 204, a Parameters method 206, and a Basic command method 208.

The Name method 204 returns the literal identifier of the associated abstract policy as presented to users. The Parameters method 206 returns a set of parameters that are allowed for the abstract policy. The Basic command method 208 receives a device type value as a parameter, and returns a list of one or more basic commands 106 that are required for implementing the abstract policy on a network device. The type and number of basic commands can depend on the type of the device or device interface for which the abstract command is defined.

Command-line interface (CLI) commands 108 are the low-level configuration commands that are understood by the operating system of a network device. For example, Cisco devices operate under control of Internetworks Operating System (IOS), which can process a particular set of CLI commands. The preferred embodiment operates in connection with existing CLI commands. Information about CLI commands may be obtained in order to analyze device configuration, or to deploy configuration information to a device.

Figure 2C:
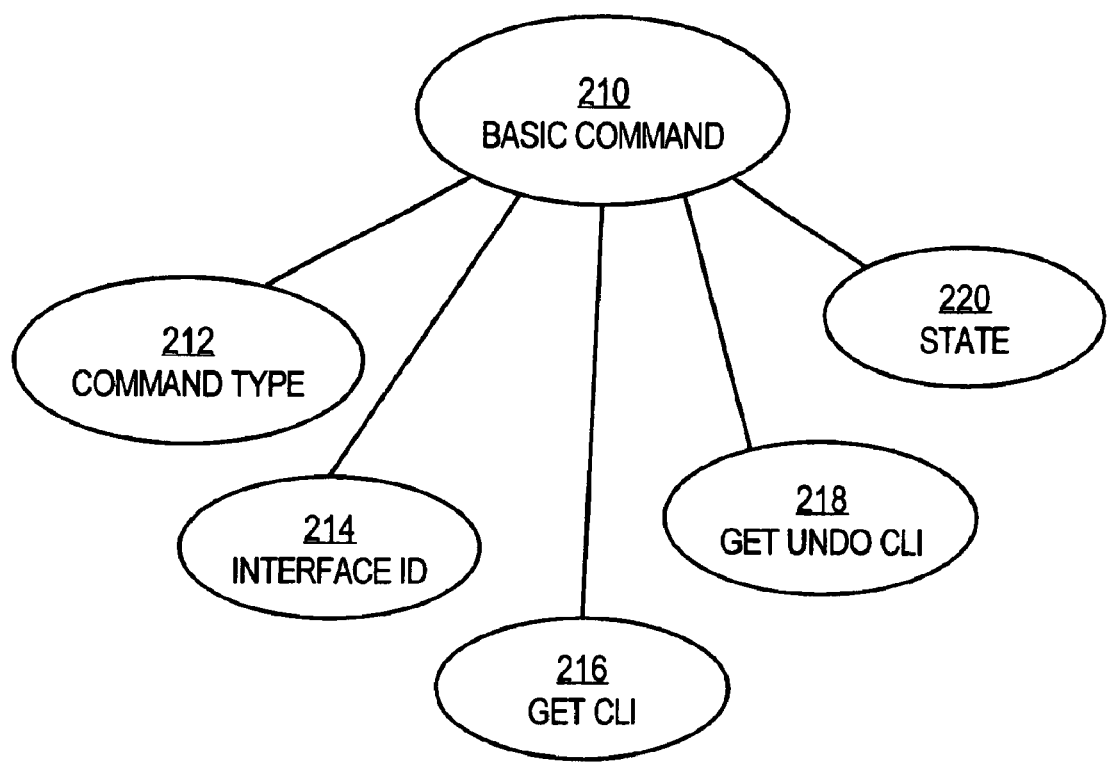
FIG. 2C is a block diagram of a basic command and its elements.

FIG. 2C is a block diagram of a basic command object and its constituent elements. Basic commands conceptually occupy a middle layer between abstract policies and CLI commands. Each basic command contains information about which CLI commands are required to implement a given abstract policy on a network device of a certain type. A basic command can be created either from an abstract policy or from a set of CLI commands uploaded from a network device.

In a preferred embodiment, each Basic Command object 210 has the following methods: CommandType, InterfaceId, getCLI, getUndoCLI, State. The CommandType method 212 returns a value indicating the type of the Basic Command. The InterfaceId method 214 returns a value of an identifier of the network device interface to which the basic command is to be applied. If no such value is set in the device, then the basic command is attached to the network device generally rather then to a specific interface.

The GetCLI method 216 returns a list of CLI commands that implement the associated basic command, and which may be directly configured on a network device. The format of each CLI command in the list is defined by the device operating system. A complementary method, the GetUndoCLI method 218, returns a list of CLI commands for removing elements of the device configuration that corresponds to the basic command.

The State method 220 returns a state value reflecting the state of the basic command. Values returned by the State method may be used in algorithms that analyze the configuration of the device. The State method 220 may return one of the following values having the following meanings:

DO—the basic command MUST be deployed to a device. The CLI commands returned by GetCLI should be used for configuration of the device.

EXIST—the basic command is currently configured on a device. The basic command can be removed from the device or used in the new configuration.

NOT_FOR_USE—the basic command is currently configured on a device and cannot be removed or used in a new configuration.

UNDO—the basic command SHOULD be removed from the new configuration. The CLI commands returned by GetUndoCLI should be used.

Functional Overview

Figure 3A:
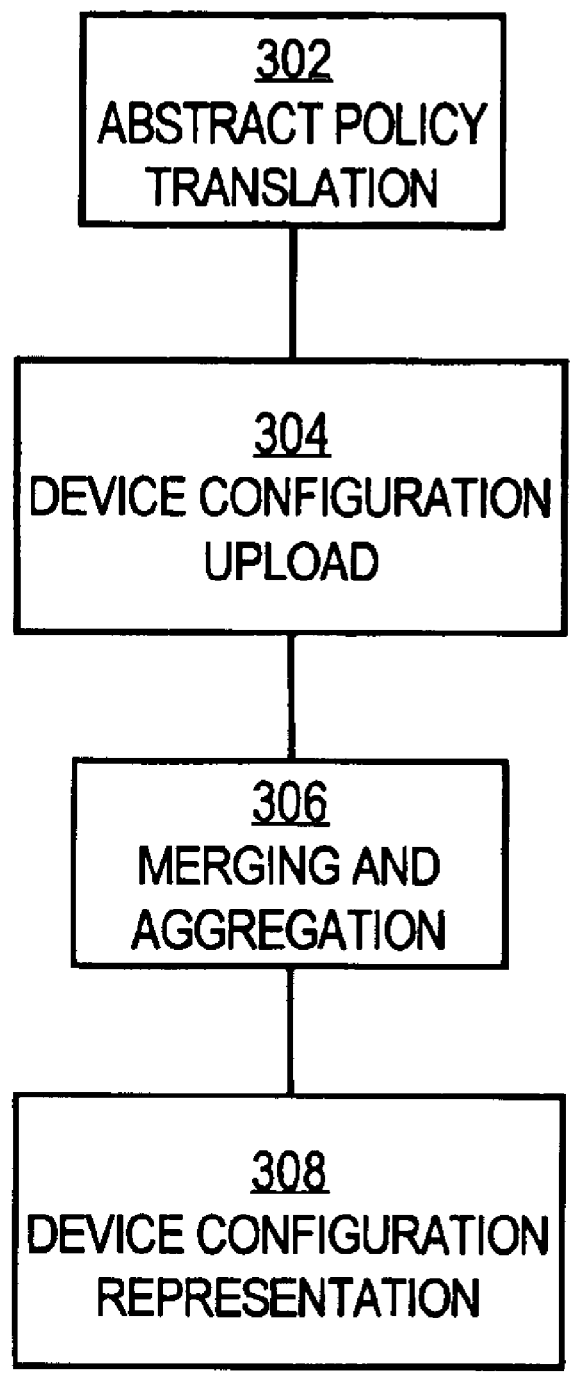
FIG. 3A is a flow diagram of a process of transforming an abstract quality of service policy into a device configuration.

FIG. 3A is a flow diagram of a process of transforming an abstract quality of service policy into a device configuration. In one embodiment, a process of representing abstract quality of service policies as one or more basic commands comprises an Abstract Policy Translation phase 302, a Device Configuration Upload phase 304, a Merging and Aggregation phase 306, and a Device Configuration Representation phase 308. Through successive execution of each phase shown in FIG. 3A, an abstract quality of service policy is transformed into a new device configuration for one or more devices.

Figure 3B:
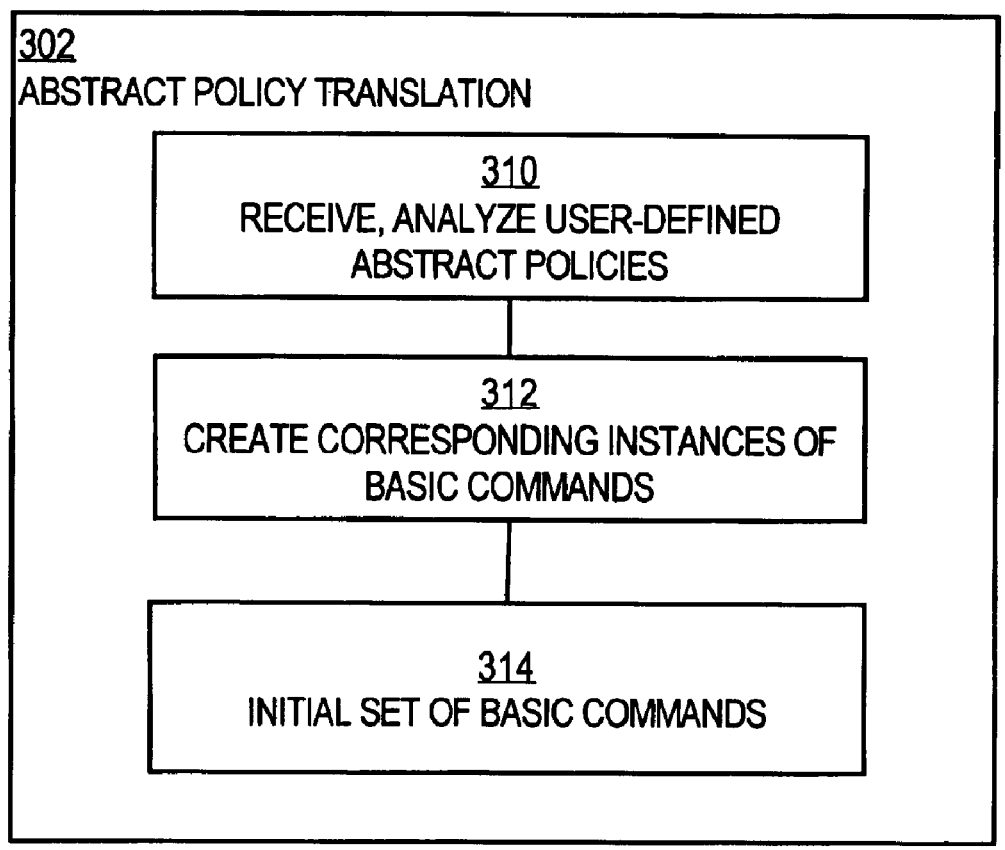
FIG. 3B is a flow diagram of a process of abstract policy translation.

FIG. 3B is a flow diagram of sub-steps that may be involved in the Abstract Policy Translation phase 302. As shown by block 310, each abstract quality of service policy that has been defined by a user using a quality of service policy management system is received and analyzed. In block 312, instances of basic commands are created to correspond with the abstract quality of service policy. The specific basic commands that are created for each abstract policy depend on the basic nature of the abstract policy, and the type of the network device and interface the policy is configured on.

As a result, an initial set of basic commands, implementing all abstract policies defined by the user, is created and stored, as shown by block 314. Block 314 also preferably involves assigning a state value of each basic command object in the set, when each basic command object is created. Basic commands in the final list that are created from the abstract policies that were received in the Abstract Policy Translation phase 302 are assigned the state value "DO."

Figure 3C:
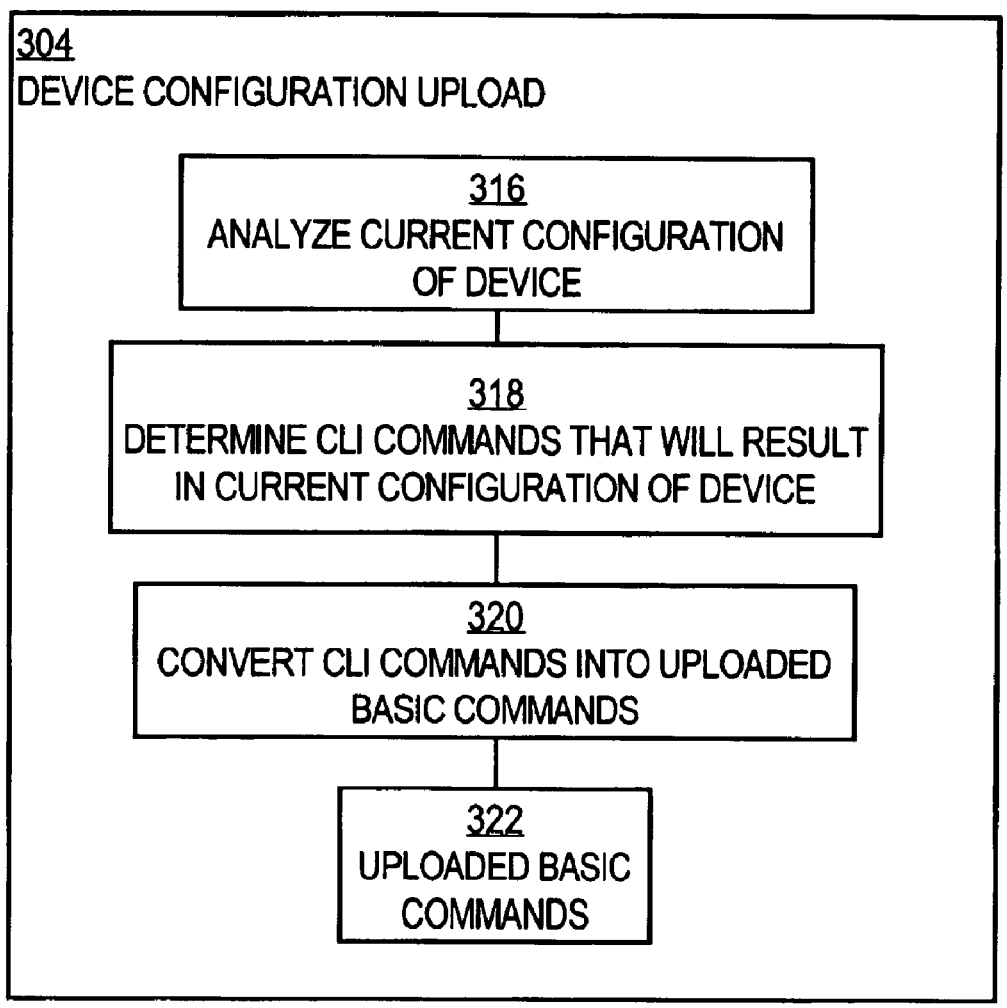
FIG. 3C is a flow diagram of a process of device configuration upload.

FIG. 3C is a flow diagram of sub-steps that may be involved in Device Configuration Upload phase 304.

In block 316, the current configuration of each device is received and analyzed. Current device configuration information may be obtained using a special CLI command (e.g., "show running config" on a Cisco router), or by other conventional means, such as device discovery processes that use one or more SNMP query messages to obtain MIB variable values. In block 318, based on the current device configuration information received from the device, the process determines one or more specific CLI commands that would create such configuration if sent to and executed by the operating system of the device. As a result, a list of CLI commands for the current device configuration is created and stored.

As indicated by block 320, each CLI command in the list is converted into one or more Basic Commands 210. The type of the created Basic Command is determined by the basic nature of the original CLI commands, and the type of the network device and interface these commands are effective for. As a result, a set of uploaded basic commands is created and stored, as indicated by block 322.

Similar to block 314, block 322 also preferably involves assigning a state value to each basic command that is created. Basic commands in the final list that originate from the current device configuration are assigned the state value "UNDO" if the configuration is a candidate for removal, and otherwise receive the state value "NOT_FOR_USE."

Figure 3D:
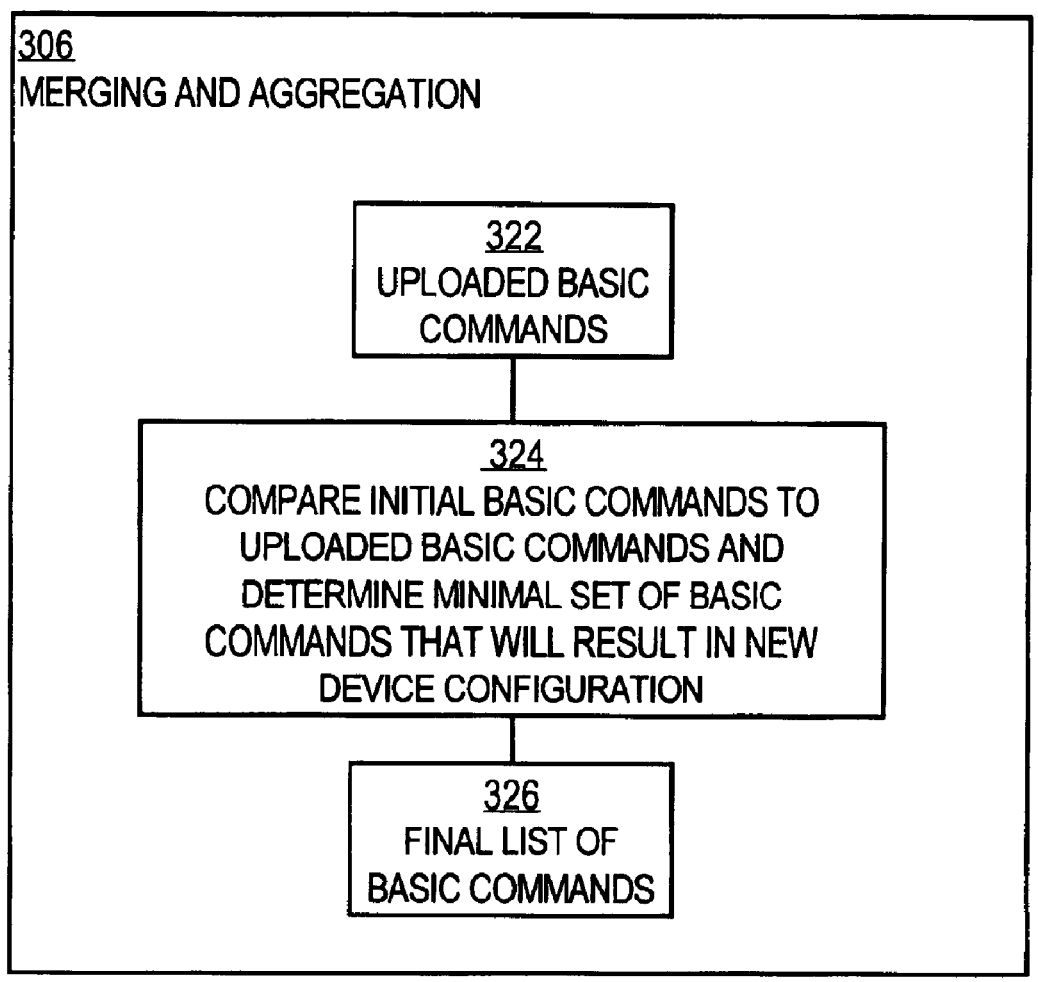
FIG. 3D is a flow diagram of a process of merging and aggregation.

FIG. 3D is a block diagram of the Merging and Aggregation phase 306. In this phase, generally, the process determines a minimal set of basic commands that are required for building a new device configuration from the existing one. Duplicate basic commands are eliminated and similar basic commands are merged into fewer basic commands. As a result, a final list of basic commands is created and stored, and the final list of basic commands represents a new configuration for the device. The new configuration represents the abstract policies defined by the user.

Specifically, as shown by block 324, in the Merging and Aggregation phase 306, the two sets of basic commands that were created in the previous phases are compared to determine a minimal set of basic commands that will result in a new device configuration that both retains features of the current device configuration, and implements the abstract policy that was received in the Abstract Policy Translation phase 302. The initial list of basic commands and the list of uploaded basic commands are evaluated and merged, resulting in creating and storing a final list of basic commands, as shown by block 326. During the process of merging and evaluation in block 324, the basic commands from the two sets are compared and their states are changed according to the following rule.

For two basic commands that have equal values of all parameters without considering the value of the State parameter If one has a state value of DO and the other has a state value of UNDO, then the commands are merged into one command that has a state value of EXIST. The output of this step is the final list of basic commands of block 326, which can be used for creating a new configuration.

Figure 3E:
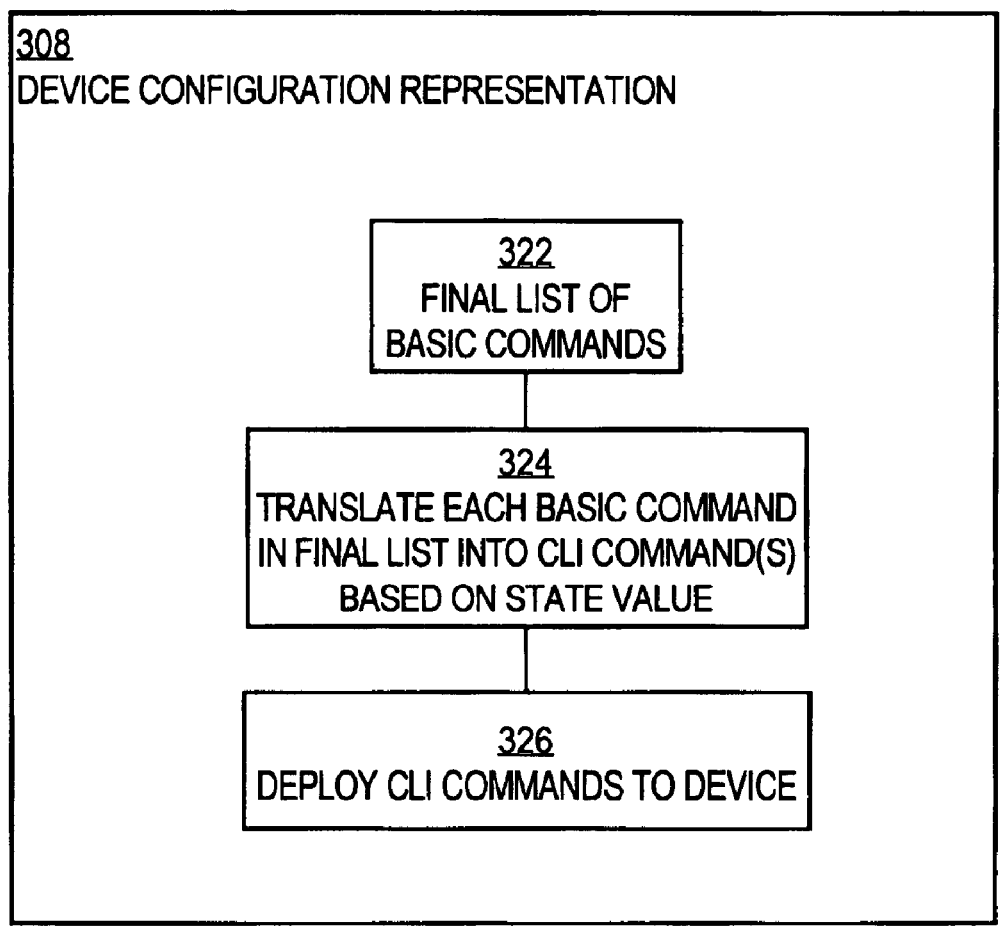
FIG. 3E is a flow diagram of a process of device configuration representation.

FIG. 3E is a block diagram of sub-steps that may be involved in the Device Configuration Representation phase 308. As input, the final list of basic commands 322 that was created in the previous phase is received. Each basic command in the final list of basic commands 322 is translated into one or more corresponding CLI commands based on state values, as shown by block 324. In the preferred embodiment, in block 324 the following rules are observed:

1. If a basic command has a state value of "DO", then the getCLI method of that basic command is used to obtain the correct corresponding CLI command for that basic command.
2. If the state value of a basic command is "UNDO", then the getUndoCLI method is used to obtain the corresponding CLI command.
3. If the state value of a basic command is "EXIST" or "NOT_FOR_USE" then no corresponding CLI command is generated.

The resulting set of CLI commands is deployed to the device, as shown by block 326. When deployed to the device, the combined set of CLI commands changes the existing configuration to match the abstract policies. The CLI commands may be deployed to one or more devices using known techniques of device communication.

As an example, assume that an abstract policy is defined for coloring packets that carry Web traffic. In the Abstract Policy Translation phase, the process creates the following basic commands: (1) a coloring basic command having a state value of "DO"; (2) an access control list basic command having a state value of "DO".

In the Device Configuration Upload phase, the process analyzes the configuration of the device to which the policy will be applied. The process determines that the proper CLI commands are those relating to limiting web traffic. In response, the process creates the following basic commands: (1) a limiting basic command with a state value of "UNDO", (2) an access list basic command with a state value of "UNDO".

In the Merging and Aggregation phase, the process creates a Limiting basic command with a state value of "UNDO"; a coloring basic command with a state value of "DO"; and an access list basic command with a state value of "EXIST".

Hardware Overview

Figure 4:
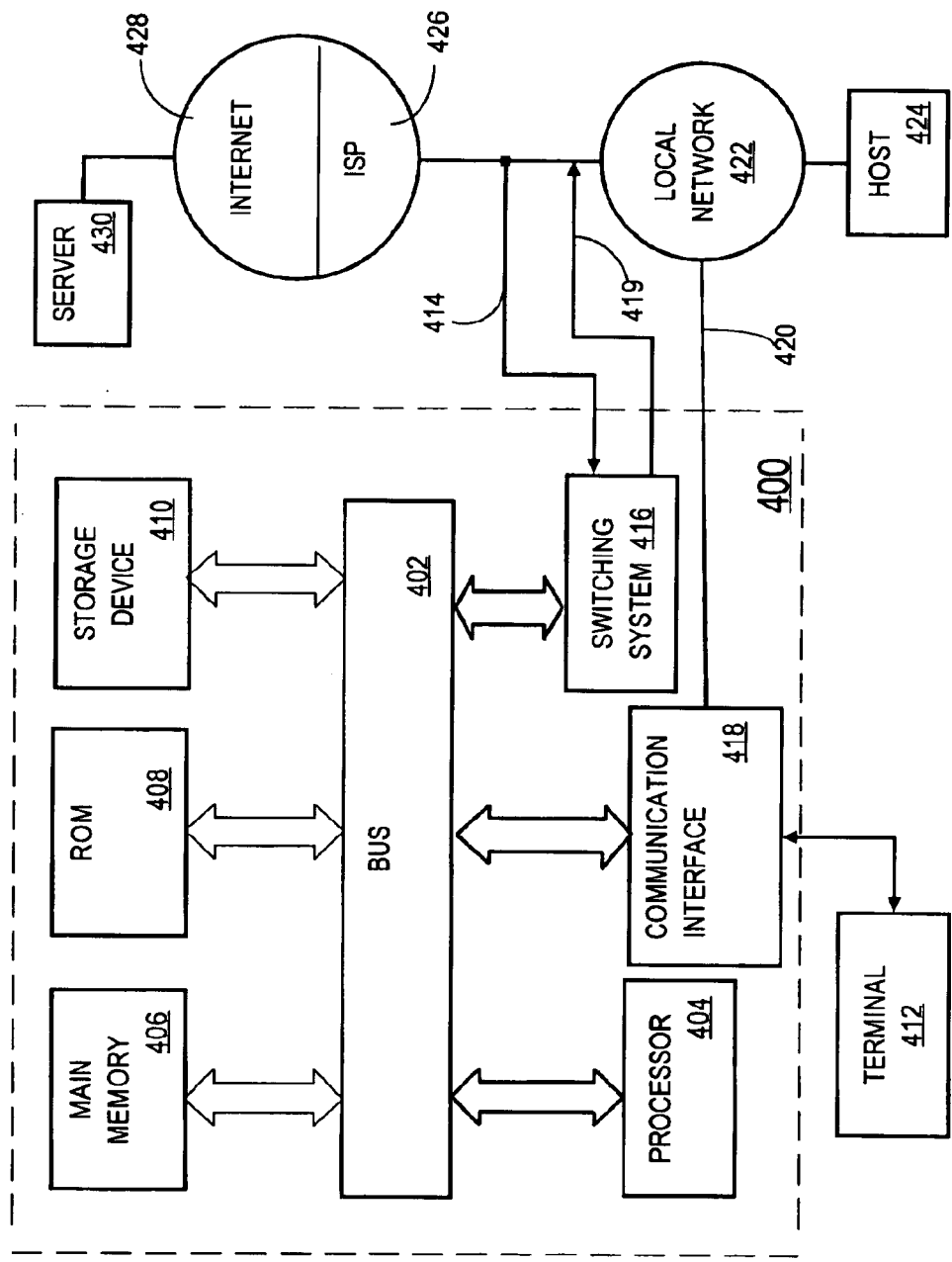
FIG. 4 is a block diagram of a computer system with which an embodiment may be used.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. In one embodiment, interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for the techniques and functions described herein in a network system. According to one embodiment of the invention, such techniques and functions are provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for the techniques and functions that are described herein.

The received code may be executed by processor 404 as it is received, and/or stored in storage device 410, or other non-volatile storage for later execution. In this manner, computer system 400 may obtain application code in the form of a carrier wave.

Applications and Advantages

Using the foregoing mechanism, network devices, such as switches and routers, can automatically enable quality of service for the flows in the opposite direction based on the service granted for the original flow for which quality of service was signaled.

Exemplary applications include video conferencing, other bi-directional video applications, Internet Protocol telephony, and client-server applications in which the links from the clients to the server are also congested and require prioritization. In any of these applications and others, a network administrator may rapidly and easily provide bi-directional quality of service. Devices in the network can be configured to automatically provide quality of service for the opposite direction of a flow so that the network administrator need only classify the traffic from one of the endpoints.

The techniques disclosed in this document are very useful in a one-to-many configuration, for example, a server with many clients. The packets may be marked on the switch near the servers, and then all switches near the clients are configured to simply mark the opposite flows with the same DiffServ value. Current solutions might require configuring many different ACLs on each and every switch; potentially at least one ACL for each server for quality of service is required.

Another context is an ISP network, for example, an ISP network that provides virtual private network services, in which a first peer node is within the network and a second peer node is outside the network. The ISP may mark traffic from the first node, for example, by creating and storing an appropriate ACL on the switch or router that is adjacent to the first node. However, for each such node the ISP would have to install a similar ACL on all network devices at the border or edge of the network and going into other ISPs. Further, these ACLs might need to be added and removed dynamically as network flows are created and stopped.

Advantageously, an embodiment permits the ISP to configure its border routers to mark each flow going through them with the same DSCP on the opposite direction. The network administrator then needs to ensure only that traffic is marked correctly within his network.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

what is claimed is:

1. A method of converting an abstract quality of service policy into a new configuration for one or more network devices, the method comprising the computer-implemented steps of:

receiving and converting the abstract quality of service policy into a first set of one or more basic commands;

receiving one or more first command line interface (CLI) commands that represent a current configuration of a network device;

determining a second set of one or more basic commands that correspond to the current configuration of the network device, based on the first CLI commands;

transforming the first and second sets of basic commands into one or more second CLI commands which, when executed by the network device, will create a new configuration for the network device that implements the abstract quality of service policy;

wherein merging and aggregation is carried out on the first and second sets of basic commands based on state values associated with the basic commands.

2. A method as recited in claim 1, wherein the step of transforming the first and second sets of basic commands comprises the steps of merging and aggregating the first and second sets of basic commands by eliminating duplicate commands and combining similar commands.

3. A method as recited in claim 2, wherein the steps of receiving and converting the abstract quality of service policy comprise the steps of:

receiving and analyzing one or more abstract policies that are defined by a user using a quality of service management system;

creating one or more corresponding instances of basic command objects, to result in creating and storing a first set of basic commands that represent the abstract policies.

4. A method as recited in claim 3, wherein the steps of receiving one or more first command line interface (CLI) commands and determining a second set of one or more basic commands comprise the steps of:

receiving the first set of basic commands;

analyzing a current configuration of the network device;

determining a third set of one or more CLI commands which, if executed by the network device, would result in creating the current configuration;

converting the third set of one or more CLI commands into a set of one or more uploaded basic commands.

5. A method as recited in claim 4, wherein the steps of merging and aggregating the first and second sets of basic commands comprises the steps of:

receiving the set of uploaded basic commands;

comparing the first set of basic commands to the set of uploaded basic commands;

creating and storing a final list of basic commands by determining a minimal set of basic commands which, if executed by the network device, would result in creating a new device configuration that implements the abstract policy.

6. A method as recited in claim 5, further comprising the steps of assigning a state value of each basic command in the final list of basic commands upon creation of each basic command.

7. A method as recited in claim 6, wherein the step of transforming the first and second sets of basic commands comprises the steps of:
- receiving the final list of basic commands;
- based on the state value of each basic command in the final list, translating each basic command in the final list into one or more second CLI commands which, when executed by the network device, will create a new configuration for the network device that implements the abstract quality of service policy.

8. A method as recited in claim 1, further comprising the step of assigning a state value of DO to each basic command in the first set upon creation of such basic command, wherein such state value indicates that the associated basic command must be deployed to the network device as part of deploying the new configuration.

9. A method as recited in claim 1, further comprising the step of selectively assigning a state value UNDO or EXIST to each basic command in the second set of basic commands, wherein a state value of UNDO indicates that the associated basic command should be removed from the network device as part of deploying the new configuration, and wherein a state value of EXIST indicates that the associated basic command is currently configured on the network device and may be removed or retained as part of deploying the new configuration.

10. A method as recited in claim 8, wherein the steps of merging and aggregating the first and second sets of basic commands comprises the steps of:
- based on the state value of each basic command in the final list, translating each basic command in the final list into one or more second CLI commands which, when executed by the network device, will create a new configuration for the network device that implements the abstract quality of service policy;
- when two of the basic commands in the final list are equivalent without considering their associated state values, and when one of the two commands has a state value of DO and the second of the two commands has a state value of UNDO, merging the two commands into one new command having a state value of EXIST.

11. A computer-readable medium carrying one or more sequences of instructions for converting an abstract quality of service policy into a new configuration for one or more network devices, which instructions, when executed by one or more processors, cause the one or more processors to carry out the steps of:
- receiving the abstract quality of service policy;
- converting the abstract quality of service policy into a first set of one or more basic commands;
- receiving one or more first command line interface (CLI) commands that represent a current configuration of a network device;
- determining a second set of one or more basic commands that correspond to the current configuration of the network device, based on the first CLI commands;
- transforming the first and second sets of basic commands into one or more second CLI commands which, when executed by the network device, will create a new configuration for the network device that implements the abstract quality of service policy;
- wherein merging and aggregation is carried out on the first and second sets of basic commands based on state values associated with the basic commands.

12. An apparatus for converting an abstract quality of service policy into a new configuration for one or more network devices, comprising:
- a quality of service management system that is coupled to a managed network comprising the one or more network devices and including means for creating and storing an abstract policy defining a quality of service for use by the network devices in carrying one or more network traffic flows;
- means for converting the abstract quality of service policy into a first set of one or more basic commands;
- means for receiving one or more first command line interface (CLI) commands that represent a current configuration of a network device;
- means for determining a second set of one or more basic commands that correspond to the current configuration of the network device, based on the first CLI commands; and
- means for transforming the first and second sets of basic commands into one or more second CLI commands which, when executed by the network device, will create a new configuration for the network device that implements the abstract quality of service policy;
- wherein merging and aggregation is carried out on the first and second sets of basic commands based on state values associated with the basic commands.

13. An apparatus for converting an abstract quality of service policy into a new configuration for one or more network devices, comprising:
- a quality of service management system that is coupled to a managed network comprising the one or more network devices and including means for creating and storing an abstract policy defining a quality of service for use by the network devices in carrying one or more network traffic flows;
- basic command processing logic coupled to the quality of service management system and comprising one or more sequences of instructions which, when executed by one or more processors, causes the one or more processors to execute the steps of:
  - converting the abstract quality of service policy into a first set of one or more basic commands;
  - receiving one or more first command line interface (CLI) commands that represent a current configuration of a network device;
  - determining a second set of one or more basic commands that correspond to the current configuration of the network device, based on the first CLI commands; and
  - transforming the first and second sets of basic commands into one or more second CLI commands which, when executed by the network device, will create a new configuration for the network device that implements the abstract quality of service policy;
  - wherein merging and aggregation is carried out on the first and second sets of basic commands based on state values associated with the basic commands.

14. A method as recited in claim 1, wherein each basic command expresses control for a network device at an intermediate level of abstraction that is lower than the abstract policy and higher than the CLI commands.

15. In a quality of service policy management system that controls deployment of quality of service policies to a plurality of routers in a managed network, a method of converting an abstract quality of service policy into a new configuration for one or more of the routers, the method comprising the computer-implemented steps of:
- receiving the abstract quality of service from the quality of service policy management system;

converting the abstract quality of service policy into an initial set of one or more basic commands;

receiving one or more first router command line interface (CLI) commands that represent a current configuration of one of the routers;

determining a set of one or more uploaded basic commands that correspond to the current configuration of the router, based on the first CLI commands;

creating and storing a final set of basic commands based on the initial set of basic commands and the uploaded basic commands;

transforming the final set of basic commands into one or more second CLI commands which, when executed by the router, will create a new configuration for the router that causes the router to implement the abstract quality of service policy;

wherein merging and aggregation is carried out on the first and second sets of basic commands based on state values associated with the basic commands.

16. A method as recited in claim 15, wherein the step of transforming the final set of basic commands comprises the steps of merging and aggregating the initial set and uploaded basic commands by eliminating duplicate commands and combining similar commands.

17. A method as recited in claim 15, wherein the steps of determining a set of one or more uploaded basic commands comprise the steps of:

receiving the initial set of basic commands;

analyzing a current configuration of the network device;

determining an interim set of one or more CLI commands which, if executed by the network device, would result in creating the current configuration;

converting the interim set of one or more CLI commands into a set of one or more uploaded basic commands.

18. A method as recited in claim 16, wherein the steps of merging and aggregating the initial first and second sets of basic commands comprises the steps of:

receiving the set of uploaded basic commands;

comparing the initial set of basic commands to the set of uploaded basic commands;

creating and storing a final list of basic commands by determining a minimal set of basic commands which, if executed by the network device, would result in creating a new device configuration that implements the abstract policy.

19. A method as recited in claim 15, further comprising the steps of assigning a state value of each basic command in the final list of basic commands upon creation of each basic command.

20. A method as recited in claim 15, further comprising the step of assigning a state value of DO to each basic command in the initial set upon creation of such basic command, wherein such state value indicates that the associated basic command must be deployed to the network device as part of deploying the new configuration.

21. A method as recited in claim 15, further comprising the step of selectively assigning a state value UNDO or EXIST to each basic command in the set of uploaded basic commands, wherein a state value of UNDO indicates that the associated basic command should be removed from the network device as part of deploying the new configuration, and wherein a state value of EXIST indicates that the associated basic command is currently configured on the network device and may be removed or retained as part of deploying the new configuration.

22. A method as recited in claim 21, wherein the steps of merging and aggregating the initial and uploaded sets of basic commands comprises the steps of:

based on the state value of each basic command in the final list, translating each basic command in the final list into one or more second CLI commands which, when executed by the network device, will create a new configuration for the network device that implements the abstract quality of service policy;

when two of the basic commands in the final list are equivalent without considering their associated state values, and when one of the two commands has a state value of DO and the second of the two commands has a state value of UNDO, merging the two commands into one new command having a state value of EXIST.

23. A method of converting an abstract quality of service policy into a configuration for one or more network devices, the method comprising the computer-implemented steps of:

receiving and converting the abstract quality of service policy into a first set of commands;

receiving a current configuration of a network device;

determining a second set of one or more commands that correspond to the current configuration of the network device, based on the received current configuration;

transforming the first and second sets of commands into a third set of commands which, when executed by the network device, will create a new configuration for the network device that implements the abstract quality of service policy.

24. A method as recited in claim 23, wherein the step of transforming the first and second sets of commands comprises the steps of merging and aggregating the first and second sets of commands by eliminating duplicate commands and combining similar commands.

25. A method as recited in claim 24, wherein the steps of receiving and converting the abstract quality of service policy comprise the steps of:

receiving and analyzing one or more abstract policies that are defined by a user using a quality of service management system;

creating one or more corresponding instances of command objects, to result in creating and storing a first set of commands that represent the abstract policies.

26. A method as recited in claim 25, wherein the steps of receiving a current configuration of the network device and determining a second set of commands comprise the steps of:

receiving the first set of commands;

analyzing a current configuration of the network device;

determining a third set of commands which, if executed by the network device, would result in creating the current configuration;

converting the third set of commands into a set of one or more uploaded commands.

27. A method as recited in claim 26, wherein the steps of merging and aggregating the first and second sets of commands comprises the steps of:

receiving the set of uploaded commands;

comparing the first set of commands to the set of uploaded commands;

creating and storing a final list of commands by determining a minimal set of commands which, if executed by the network device, would result in creating a new device configuration that implements the abstract quality of service policy.

28. A method as recited in claim 27, further comprising the steps of assigning a state value of each command in the final list of commands upon creation of each command.

29. A method as recited in claim 28, wherein the step of transforming the first and second sets of commands comprises the steps of:

receiving the final list of commands;

based on the state value of each command in the final list, translating each command in the final list into a third set of commands which, when executed by the network device, will create a new configuration for the network device that implements the abstract quality of service policy.

30. A method as recited in claim 23, further comprising the step of assigning a state value of DO to each command in the first set upon creation of such command, wherein the state value of "DO" indicates that the associated command must be deployed to the network device as part of deploying the new configuration.

31. A method as recited in claim 23, further comprising the step of selectively assigning a state value UNDO or EXIST to each command in the second set of commands, wherein the state value of UNDO indicates that the associated command should be removed from the network device as part of deploying the new configuration, and wherein the state value of EXIST indicates that the associated command is currently configured on the network device and may be removed or retained as part of deploying the new configuration.

32. A method as recited in claim 30, wherein the steps of merging and aggregating the first and second sets of commands comprises the steps of:

based on the state value of each command in the final list, translating each command in the final list into a third set of commands which, when executed by the network device, will create a new configuration for the network device that implements the abstract quality of service policy;

when two of the commands in the final list are equivalent without considering their associated state values, and when one of the two commands has a state value of DO and the second of the two commands has a state value of UNDO, merging the two commands into one new command having a state value of EXIST.

33. A computer-readable medium carrying one or more sequences of instructions for converting an abstract quality of service policy into a new configuration for one or more network devices, which instructions, when executed by one or more processors, cause the one or more processors to carry out the steps of:

receiving the abstract quality of service policy;

converting the abstract quality of service policy into a first set of one or more commands;

receiving a current configuration of a network device;

determining a second set of one or more commands that correspond to the current configuration of the network device, based on the received configuration;

transforming the first and second sets of commands into a third set of commands which, when executed by the network device, will create a new configuration for the network device that implements the abstract quality of service policy.

34. An apparatus for converting an abstract quality of service policy into a new configuration for one or more network devices, comprising:

a quality of service management system that is coupled to a managed network comprising the one or more network devices and including means for creating and storing a quality of service policy for use by the network devices in carrying one or more network traffic flows;

means for converting the quality of service policy into a first set of one or more commands;

means for receiving a current configuration of a network device;

means for determining a second set of one or more commands that correspond to the current configuration of the network device, based on the first commands; and means for transforming the first and second sets of commands into a third set of commands which, when executed by the network device, will create a new configuration for the network device that implements the quality of service policy.

35. An apparatus for converting a quality of service policy into a new configuration for one or more network devices, comprising:

a quality of service management system that is coupled to a managed network comprising the one or more network devices and including means for creating and storing a quality of service policy for use by the network devices in carrying one or more network traffic flows;

command processing logic coupled to the quality of service management system and comprising one or more sequences of instructions which, when executed by one or more processors, causes the one or more processors to execute the steps of:

converting the quality of service policy into a first set of one or more commands;

receiving a current configuration of a network device;

determining a second set of one or more commands that correspond to the current configuration of the network device, based on the received configuration; and transforming the first and second sets of commands into a third set of commands which, when executed by the network device, will create a new configuration for the network device that implements the abstract quality of service policy.

36. A method as recited in claim 23, wherein each command in the first and second set of commands expresses control for a network device at an intermediate level of abstraction that is lower than the abstract quality of service policy and higher than the received configuration.

* * * * *

UNITED STATES PATENT AND TRADEMARK OFFICE
CERTIFICATE OF CORRECTION

| | | |
|---|---|---|
| PATENT NO. | : 6,959,332 B1 | Page 1 of 1 |
| APPLICATION NO. | : 09/614365 | |
| DATED | : October 25, 2005 | |
| INVENTOR(S) | : Arthur Zavalkovsky et al. | |

It is certified that error appears in the above-identified patent and that said Letters Patent is hereby corrected as shown below:

Title page,
Item [56], References Cited, U.S. PATENT DOCUMENTS, add
-- 6,170,009   B1   1/2001        Mandal et al. --.

Signed and Sealed this

Twentieth Day of June, 2006

JON W. DUDAS
*Director of the United States Patent and Trademark Office*